United States Patent [19]

Zaffignani et al.

[11] 3,894,175

[45] July 8, 1975

[54] LINE CONTROL UNIT FOR TELEPRINTERS

[75] Inventors: Giovanni Zaffignani, Ivrea; Oscar Mannocchi, Torino, both of Italy

[73] Assignee: Ing. C. Olivetti & C., S.p.A., Ivrea (Torino), Italy

[22] Filed: Nov. 16, 1973

[21] Appl. No.: 416,571

[30] Foreign Application Priority Data

Dec. 22, 1972 Italy .......................... 71041/72

[52] U.S. Cl. .......................... 178/2 R; 178/69 G

[51] Int. Cl. .......................... H041 25/02

[58] Field of Search .......................... 178/2 R, 3, 4.1 R; 179/2 DP, 84 R, 99; 307/278, 311

[56] References Cited

UNITED STATES PATENTS

| | | | |
|---|---|---|---|
| 3,644,672 | 2/1972 | Teurnier et al. | 178/2 R |
| 3,766,325 | 10/1973 | Hatfield et al. | 179/99 |
| 3,767,978 | 10/1973 | Wernli | 307/311 |
| 3,801,837 | 2/1974 | Pease et al. | 307/311 |

*Primary Examiner*—Thomas A. Robinson

*Attorney, Agent, or Firm*—Schuyler, Birch, Swindler, McKie & Beckett

[57] ABSTRACT

A control unit for connecting a teleprinter to a transmission line wherein the electrical insulation between the teleprinter and the line is achieved by optoelectronic circuits. These circuits comprise a photoemissive diode connected to the control unit of the teleprinter and a photosensitive transistor, connected to the line, and optically coupled to the diode for transmitting electrical signals coming from the control unit to the line and for electrically insulating the control unit from the line at the same time.

3 Claims, 7 Drawing Figures

LINE CONTROL UNIT FOR TELEPRINTERS

CROSS-REFERENCE TO RELATED APPLICATION:

Applicants claim priority from the corresponding Italian Patent Application Ser. No. 71041-A/72 filed Dec. 22, 1972.

BACKGROUND OF THE INVENTION

1. Field of the Invention:

The present invention relates to a line control unit adapted to connect a teleprinter to a telegraph line.

2. Description of the Prior Art:

As is known, international regulations prescribe that a line control unit must be electrically isolated from the telegraph line. In a line control unit of known type, this isolation is achieved by means of suitable connecting relays which connect the output circuits of the line control unit to the telegraph line and at the same time ensure the prescribed electrical isolation. These connecting relays, however, have the disadvantage of requiring continuous maintenance owing to the fact that they include mechanical, movable parts. Moreover, since modern line control units are produced by means of printed circuits and are contained on a single board, these connecting relays have the disadvantage of being bulky and, therefore, poorly adapted to being mounted on printed circuit boards.

Another disadvantage which these relays have is that of introducing distortions into the incoming and outgoing signals, these distortions being principally due to the inertia of the movable parts in following the variations of current in the telegraph line.

OBJECTS AND SUMMARY OF THE INVENTION

According to the present invention, there is provided a line control unit of a teleprinter, comprising at least one command conductor connected to the teleprinter to receive and/or transmit a plurality of command signals from/to the said teleprinter, a pair of line conductors connected to a telegraph line to receive and/or transmit the signals from/to the telegraph line, and a plurality of opto-electronic coupling circuits so coupling the command conductor(s) to the line conductors as to provide electrical isolation therebetween, each signal of the said plurality of signals being adapted to energise a photoemissive circuit of a corresponding one of the coupling circuits, and each photoemissive circuit being optically coupled to a photosensitive circuit of the corresponding coupling circuit.

BRIEF DESCRIPTION OF THE DRAWINGS

The embodiment of the invention will now be described, by way of example, with reference to the accompanying drawings, in which.

DETAILED DESCRIPTION OF THE INVENTION

Figure 1:
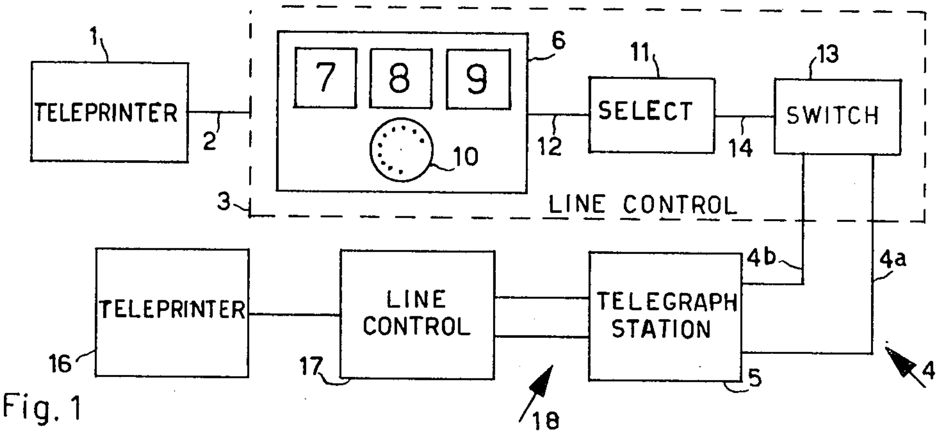
FIG. 1 is a block diagram of a communication system for teleprinters.

In a telegraphic communication system, each teleprinter 1 (FIG. 1) is connected through the medium of a cable 2 to the corresponding line control unit 3, which is connected in turn to a telegraph line 4. As is known, the telegraph lines 4 may be of two types, four-wire and two-wire. By way of example, there will now be considered the single current telegraph line which as is known, is formed in almost all cases by two wires **4*a* and 4*b* through which direct current flows and connected to a telegraph station 5. The latter supplies in known manner an electric voltage sufficient to cause the direct current to flow in the conductors 4*a* and 4*b***. As is known, the telegraph stations may be of two types, so-called type A stations which accept selection of the called number only through the keyboard of the teleprinter, and so-called type B stations which accept selection of the called number both through the keyboard of the teleprinter and through a dial.

The line control unit 3 handles, as is known, a series of operations adapted to connect the teleprinter 1 to the telegraph line 4. In particular, it handles:

- local operation;
- requests for connection to another teleprinter;
- selection of the number of the teleprinter to which it is desired to be connected;
- connection between the calling and the called teleprinter;
- the end or termination of the connection;
- automatic connection in the case of an outside call which arrives during local operation of the teleprinter.

To each of these operations there corresponds a particular line current the intensity of which is varied by the line control unit in the manner which will be described hereinafter.

The line control unit 3 essentially comprises a control panel 6 on which there are mounted three function keys 7, 8 and 9, the functions of which will be explained hereinafter; in the event of the station being of type B, the line control unit also comprises a dial 10. The line control unit 3 moreover comprises a selection circuit 11 connected to the panel 6 by a cable 12 and a switching circuit 13 connected to the circuit 11 by a group of conductors indicated generally by the reference 14. The circuit 11 is controlled by the keys 7, 8 and 9 and by the dial 10 to select the various operations of the line control unit 3 in the manner to be described hereinafter, while the switching circuit 13 is controlled by the selection circuit 11 to modulate or interrupt the current on the telegraph line 4.

Figure 2:
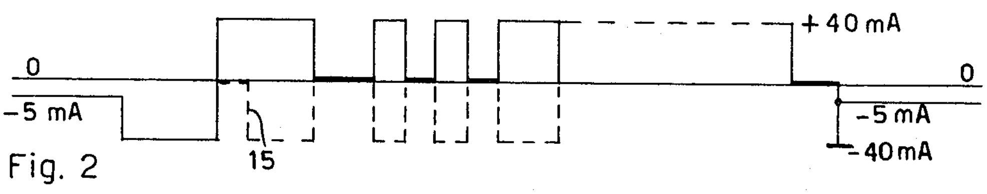
FIGS. 2 and 3 are diagrams of the line currents of the system of FIG. 1.

More particularly, when the line control unit is on local operation or when it is inoperative, the line current has a value equal to −5mA (FIG. 2). When, on the other hand, it is desired to select the request for connection, the operator actuates the key 8, which in turn commands the switching circuit 13 (FIG. 1) to bring the current to a value of −40mA (FIG. 2). The algebraic sign of the current is conventionally negative for a current entering the line control unit on the wire **4*a* and leaving on the wire 4*b*. At this point, if the station 5 is of type A, it informs the selection circuit 11 of the line control unit 3 to accept the call by reversing the polarity of the current and bringing it to a value of +40mA. If, on the other hand, the station 5 is of type B, it informs the selection circuit 11 (FIG. 1**) of the line control unit 3 to accept the call by sending a negative pulse 15 (FIG. 2).

Figure 3:
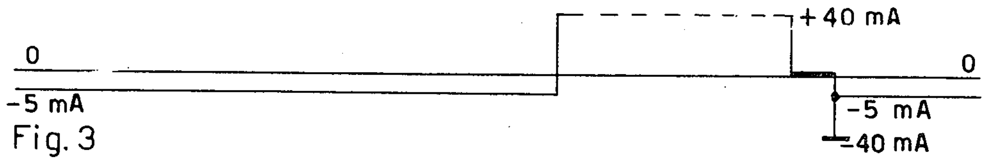

When the selection circuit 11 recognizes either the change in current from −40mA to +40mA or the pulse 15, it enables the selection of the number of the called teleprinter 16. It is appropriate to note that, while in the case of stations of type A the modulation of the line current is effected by the line control unit 3 on positive values of the current, in the case of selection for stations of type B, it is effected on negative values (dash line in FIG. 2). When the number of the called teleprinter 16 is recognised by the station 5, it communicates the call to the line control unit 17 of the called teleprinter 16, bringing the current of the line 18 of the value of −5mA to the value of +40mA (FIG. 3). At this point, on both of the lines 4 and 18 there is present a current of +40mA, which indicates to the two line control units 3 and 17 that connection has taken place, so that transmission of the message can occur. When the message has been transmitted, the operator actuates the end or termination key 9, which commands the switching circuit 13 to interrupt the current on the line 4 for a predetermined period of time. This interruption is recognised in known manner by the station 5, which reverses the polarity of the current on both of the lines 4 and 18, bringing them to a value of −40mA (FIGS. 2 and 3). At this point, the two line control units 3 and 17 recognise the end of the connection and change the value of the current of the two lines 4 and 18, bringing it to the inoperative value equal to −5mA.

A detailed description of the line control unit 3 will now be given with reference to the switching circuit 13 and the selection circuit 11.

SWITCHING CIRCUIT (FIG. 4).

As has been stated hereinbefore, the switching circuit 13 is adapted to modulate and interrupt the current on the conductors 4*a* and 4*b* of the telegraph line 4. The difference of potential between the two conductors 4*a* and 4*b* is supplied by the telegraph station 5 and is equal to about 110V. The conductors 4*b* and 4*a* are connected to the collector of an n-p-n transistor 24 respectively via a resistor 22 of suitable value and a diode 23, and via a diode 20. The emitter of the transistor 24 is connected to a reference potential T, while the base is connected directly to the collector of a second transistor 25, the base of which is connected in turn to the collector of a third transistor 26 of the type having a photosensitive base which will be better described hereinafter. The emitters of the two transistors 25 and 26 are both connected to the reference potential T, while the collectors are connected via two biasing resistors 27 and 28 to a source M of positive potential.

As has been stated, the transistor 26 is of the type having a photosensitive base, that is the base current of the transistor 26 is proportional to the intensity of the light falling on the base. In fact, the base of the transistor 26 is optically coupled to a photoemissive diode, the collector of which is connected to a source of positive potential. The potential of the conductor 30, which is included in the group of conductors 14 (FIG. 1) and connected to the cathode of the photodiode 29 (FIG. 4), is variable as a function of a signal L generated by the selection circuit 11 in the manner which will be described hereinafter. More precisely, when the signal L is at logical level 0 (low potential), the diode 29 is rendered conducting and therefore brings the transistor 26 to saturation. Consequently, the transistor 25 is blocked and the transistor 24 is in turn saturated.

The diode 29 and the transistor 26 are mounted on a single support and therefore form a single circuit element 31 which is commonly known on the market as an "optoelectronic coupler" and is readily available on the market under this name. This optoelectronic coupler 31 offers the advantage of coupling the conductor 30 to the transistor 25 in such manner that they are electrically isolated and, in the embodiment described, offers the advantage of generating at its output 32 a signal of the same logical level as the input signal. In fact, if the signal L is at level 0, the output 32 of the optoelectronic coupler 31 is also at logical level 0, as has been explained hereinbefore.

A second conductor 35, coming from the selection circuit 11 and included in the group of conductors 14, is connected to a second optoelectronic coupler 36 of the same type as the coupler 31. The coupler 36 comprises a photoemissive diode 29′ and a photosensitive transistor 26′ and is connected in turn via a transistor 37 to the base 38 of a second transistor 39. The connection between the coupler 36 and the transistors 37 and 39 is of the same type as that described for the coupler 31 and the transistors 24 and 25, for which reason it is not described in detail. Consequently, the transistor 39 is saturated when the voltage of the conductor 35 is at logical level 0. The logical level of the conductor 35 is determined in turn by a signal TR also originating from the selection circuit 11. To sum up, the two optoelectronic couplers 31 and 36 isolate the switching circuit 13 electrically from the conductors 30 and 35 coming from the selection circuit 11 which, as will be explained hereinafter, is connected electrically to the line 4. Consequently, the teleprinter 1 and the line control unit 3 are electrically isolated from the line 4 in conformity with the regulations hereinbefore mentioned.

The collector of the transistor 39 is connected by means of a conductor 45 to a node 46 of a bridge circuit 47 formed by four diodes 48, 49, 50 and 51. The node 52 of the bridge 47 is connected to the conductor 4*a* of the telegraph line 4, while the node 53 is connected by means of two conductors 54 and 55 to the emitters of the transistors 24 and 39, respectively.

The node 56 is connected by means of the conductors 57 and 58 to the collector 59 of a photoemissive diode 60 and the cathode 61 of the diode 60 is connected in turn by means of the wires 62 and 63 to the conductor 4*b* of the telegraph line 4. The diode 60 is optically coupled to the base of an n-p-n phototransistor 64, the emitter of which is connected to earth potential. The collector of the phototransistor 64, on the other hand, is connected via a biasing resistor 65 to a source of positive potential. The photodiode 60 and the phototransistor 64 form a third optoelectronic coupler 70 which therefore isolates the conductor 63 connected to the telegraph line 4 electrically from the conductor 77 connected to the switching circuit 13 of the line control unit 3.

Figure 4:
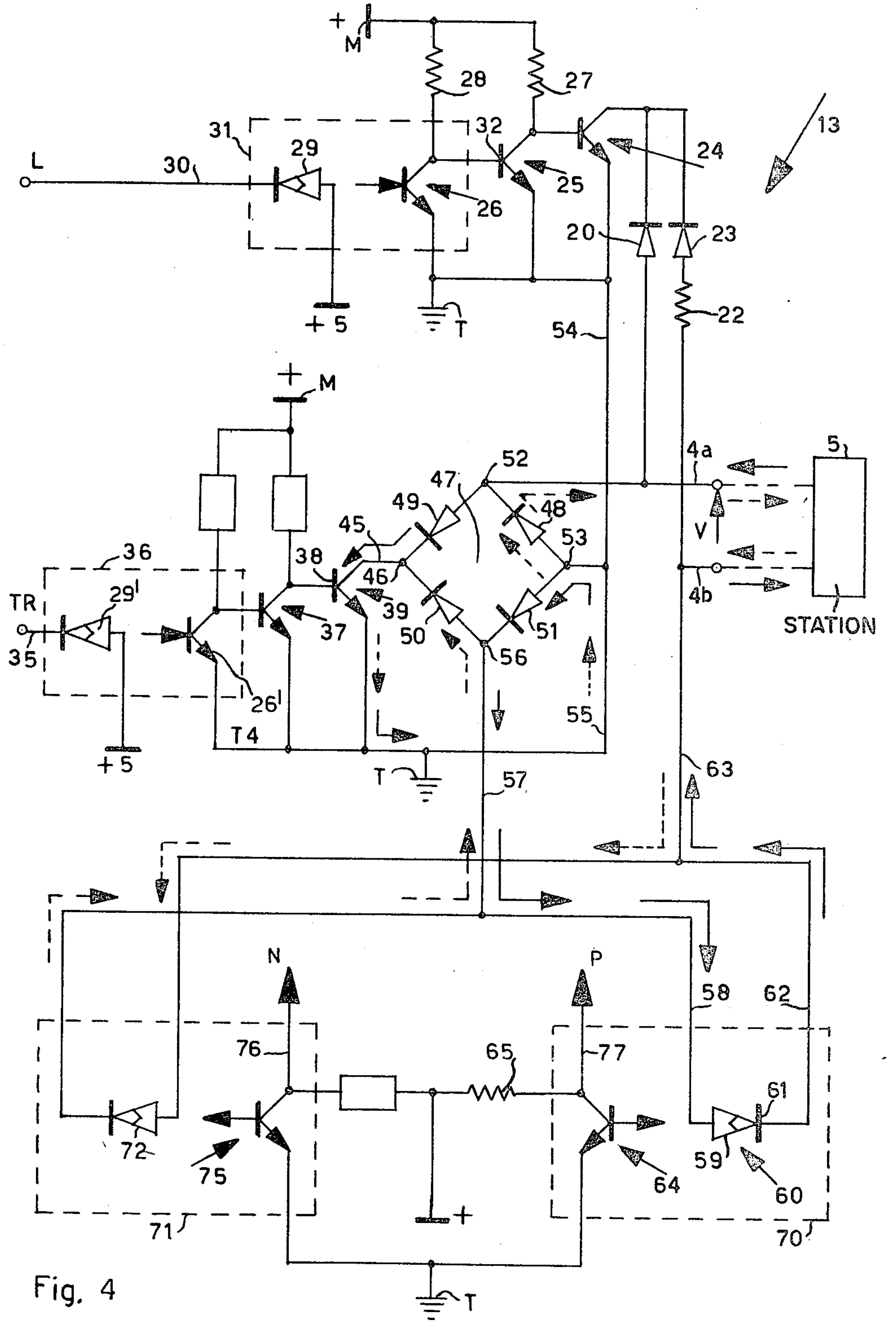
FIG. 4 is a diagram of the switching circuit of a two-wire line control unit embodying the invention.

As can be observed from FIG. 4, the diode 60 of the coupler 70 is connected in such manner that it allows the passage only of the current indicated by the solid-line arrow, which, as has been stated, is conventionally considered as being of positive sign. Since a negative current can also flow in the telegraph line, this negative current being indicated by a dashline arrow, the conductors 57 and 63 are connected to a second coupler 71 in a completely similar manner to that described for the coupler 70. The sole difference consists merely in the fact that the photodiode 72 of the coupler 71 is biased in the opposite direction to that of the photodiode 60. It is to be noted, finally, that if a negative current flows the photodiode 72 brings the transistor 75 to saturation, as a result of which the output 76 of the latter generates a signal N at level 0. On the other hand, if a positive current flows, the photodiode 70 brings the transistor 64 to saturation, as a result of which the output of the latter generates a signal P at level 0. The two outputs 76 and 77 of the switching circuit 13 are included in the group of conductors 14 (FIG. 1) connected to the selection circuit 11 and are moveover electrically isolated from the line 4 through the medium of the two couplers 70 and 71.

It can therefore be concluded that the switching circuit 13 is electrically isolated from the selection circuit 11 owing to the fact that both its inputs 30 and 35 and its outputs 76 and 77 are connected to the couplers 31, 36, 70 and 71; the switching circuit 13 is moreover electrically isolated from the line 4 by means of the two couplers 70 and 71. The inputs 30 and 35 of the switching circuit 13 are activated by the selection circuit 11 in such manner that the signal L is 0 and TR is 1, or the signal L is 1 and TR is 0, or so that L = 1 and TR = 1.

When L = 0 and TR = 1 and the line current is negative, the transistor 24 is brought to saturation and the transistor 39 is blocked, as has been said hereinbefore; because of this, the current coming from the conductor 4*b* can pass through the resistor 22, the diode 23 and the transistor 24 and reaches the node 53 of the bridge 47. At this point, the current cannot flow through the diodes 51 and 50, since the transistor 39 is blocked. On the other hand, the current can flow through the diode 48 and the conductor 4*a* of the telegraph line 4. In this way, the state L = 0 and TR = 1 determines the flow of a negative current (that is a current entering the conductor 4*b* and indicated by the dash-line arrow) through the resistor 22, as a result of which the value of this current is equal to the line voltage divided by the resistor 22, that is it is equal to −5mA. This current, as has been said, corresponds to the inoperative state and the local operation state, so that it can be concluded that when the selection circuit 11 generates the signals L = 0 and TR = 1 on the conductors 30 and 35 the current flowing in the line 4 has a value of −5mA. On the other hand, when the line current is positive, in correspondence with the call from the station 5 (FIG. 3), it flows through the diode 20 (FIG. 4) and the transistor 24. At the same time, the coupler 70 signals this positive current to the selection circuit 11, as a result of which the circuit 11 generates the signals L and TR at levels 1 and 0, respectively, as will be better described hereinafter. Consequently, the transistor 24 is blocked and the transistor 39 is brought to saturation. Because of this, if the line current is negative (entering the conductor 4*b*), it cannot flow through the resistor 22, but flows through the conductor 63, the photodiode 72 and the conductor 57 and reaches the node 56 of the bridge 47. Since the diode 51 cannot conduct being reverse-biased, the current enters the diode 50 and, flowing through the transistor 39 brought to saturation by the signal TR = 0, reaches the node 53 of the bridge 47. At this point, the current enters the diode 48 and therefore reaches the conductor 4*a* of the telegraph line 4. It is to be noted that the current cannot flow through the diode 51 since the two nodes 53 and 56 are at about the same potential, the transistor 39 being saturated. From what has been said, it can be concluded that if the signal L = 1 and TR = 0, the negative current does not pass through the resistor 22 and is therefore limited by the resistance of the telegraph line 4, assuming the value of −40mA.

If the line current is positive, that is enters the conductor 4*a*, it passes through the diode 49, the conductor 45, the transistor 39 and reaches the node 53. From here, through the diode 51 and the conductors 57 and 58, it reaches the photodiode 59 and, from here, through the conductors 62 and 63, reaches the conductor 4*b* of the telegraph line 4. Also in the case of positive current, if L = 1 and TR = 0, the current cannot flow through the resistor 22 and therefore assumes the value of +40mA.

Finally, when the selection circuit 11 generates the signals L = 1 and TR = 1, the two transistors 24 and 39 are blocked, as a result of which the two conductors 4*a* and 4*b* cannot be connected and therefore no current can flow on the line 4.

From what has been said it can be concluded a. that the state L = 0 and TR = 1 relates to the inoperative state and the local operation state (line current equal to −5ma) and that in this state the signals N = 1 and P = 1 are present on the output conductors 76 and 77 of the switching circuit 13;
b. that the state L = 1 and TR = 0 may relate either to connection in transmission (line current equal to +40mA) or to selection by a station of type B (line current equal to −40mA). In the first case, the signals N = 1 and P = 0 will be respectively present on the conductors 76 and 77. In the second case, the signals N = 0 and P = 1 will be present.
c. that the state L = 1 and TR = 1 relates to the end of the connection (zero line current) and that the signals N = 1 and P = 1 will be present on the two conductors 76 and 77.

The switching circuit 13 therefore not only has the function of modulating the current, but also that of indicating through the two signals N and P the polarity of the line current and also the absence of the said current.

SELECTION CIRCUIT

The selection circuit 11, as has been said, is adapted to select the working states of the line control unit 3 in correspondence with the commands supplied by the panel 6. As has already been said, the station 5 can generate a command requesting connection by means of the reversal of polarity of the line current (FIG. 3), a command inviting selection by means of the negative pulse 15 (FIG. 2) and, finally, generates pulses corresponding to the message transmitted by the calling teleprinter. Since all the commands and the signals coming from the station 5 are identified by the polarity of the line current, the selection circuit 11 has as inputs the conductors 76 and 77 coming from the switching circuit 13, which, as has been said, generate two signals N and P significative of the polarity of the line current. The selection circuit 11 is moreover connected to the switching circuit 13 through the medium of the output conductors 30 and 35 which, as has been said, are adapted to change the line current in correspondence with the signals L and TR present on them.

Figure 5:
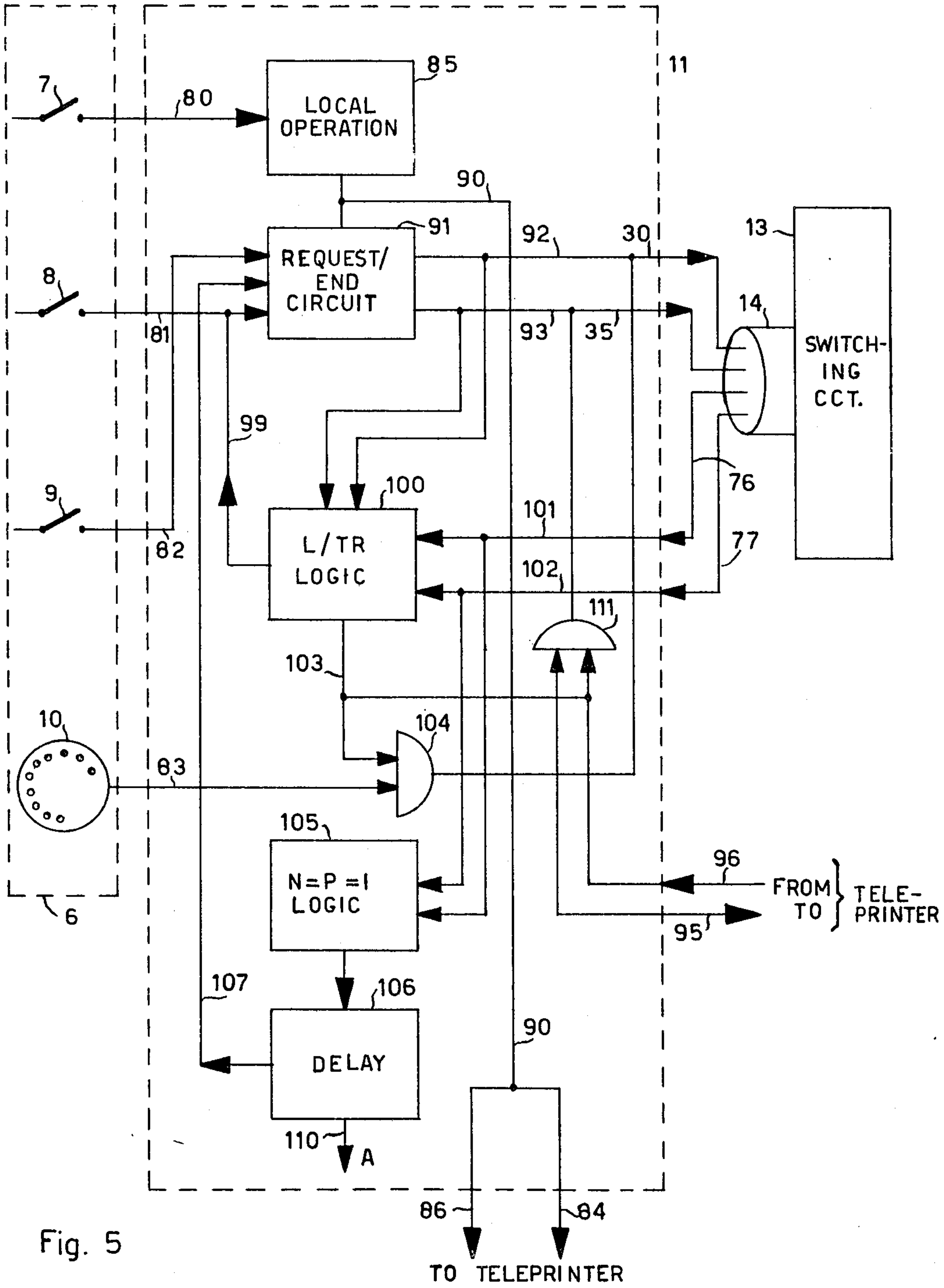
FIG. 5 is a diagram of the selection circuit of a two-wire line control unit embodying the invention.

The selection circuit 11 is moreover connected to the panel 6 via the cable 12 which, more particularly, is constituted by three conductors 80, 81 and 82 (FIG. 5) connected to the keys 7, 8 and 9, respectively, and a conductor 83 connected to the dial 10.

Finally, the selection circuit 11 is directly connected to the teleprinter 1 via the cable 2, which is constituted more particularly by a conductor 84 connected to the circuit activating the motor actuating the teleprinter 1, a conductor 86 connected to the receiving relay of the teleprinter 1, a conductor 95 connected to the keyboard of the teleprinter and adapted to activate in known manner the decoding circuit of the teleprinter, and a conductor 96 coming from the decoding circuit of the keyboard.

The motor driving the teleprinter 1, the decoding circuit of the keyboard and the receiving relay may be of any known type and are therefore not described in detail and are not shown in the drawings. However, a brief description of their operation will now be given: the driving motor commands all the operations of the teleprinter, such as printing, the advance of the carriage, etc., the decoding circuit of the keyboard is adapted to generate a sequence of coded pulses corresponding to the key actuated, and finally the receiving relay is adapted to receive the coded pulses, whether coming from the keyboard or from the telegraph line 4, to transmit them to the printer of the teleprinter or to the tape perforator.

The selection circuit 11 comprises in particular a circuit 85 connected via the conductor 80 to the key 7 of the panel 6 and adapted to generate, in correspondence with the actuation of the key 7, a signal on the conductor 90 connected to the conductors 84 and 86.

The selection circuit 11 moreover comprises a second circuit 91 connected via the conductor 81 to the key 8; the circuit 91 is adapted to generate on its outputs 92 and 93 two signals at logical levels 1 and 0, in correspondence with the actuation of the key 8. The two outputs 92 and 93 are connected in turn to the conductors 30 and 35, respectively, as a result of which the signals generated by the circuit 91 and corresponding to the already mentioned signals L and TR are transmitted to the switching circuit 13. When the key 8 is not actuated, on the other hand, the circuit 91 generates on its outputs 92 and 93 two signals at logical levels 0 and 1, respectively.

Finally, the circuit 91 is connected to the key 9 in such manner that when the latter is actuated it generates on its outputs two signals both at logical level 1.

The outputs 92 and 93 are moreover connected to a third circuit 100 which receives via the conductors 101 and 102 the signals N and P present on the conductors 76 and 77. The circuit 100 is constructed in such manner that when there are present on the outputs 92 and 93 the signals L and TR at logical levels 1 and 0, respectively, and one of the signals N and P present on the conductors 76 and 77 assumes the logical level 0, it activates its output 103. In this way, it enables both the keyboard of the teleprinter 1 through the conductor 95 and the gate circuit 104 through the conductor 103 to permit the pulses coming from the dial 10 to be able to be transmitted on the conductor 35. The conductor 103 moreover enables an input of the gate circuit 111, the output of which is connected to the conductor 35. The other input of the gate circuit 111 is connected to the conductor 96 coming from the keyboard of the teleprinter 1.

When, on the other hand, the signals L and TR present on the conductors 92 and 93 assume the logical levels 0 and 1 and the signals N and P present on the conductors 76 and 77 assume the logical levels 1 and 0, the circuit 100 activates its output 99 connected to the conductor 81 coming from the key 8. The circuit 91 then generates on its outputs 92 and 93 the signals L and TR at logical levels 1 and 0, respectively.

Finally, the selection circuit 11 comprises another circuit 105 which is adapted to activate a delay circuit 106 when it recognizes that the signals N and P present on the conductors 101 and 102, respectively, are both at level 1. The delay circuit 106 is of a known type and is adapted to generate on its output 107, with a predetermined delay, a signal which is transmitted to the circuit 91 if the signals N and P remain at level 1 for the interval of time equal to the delay time of the said delay circuit. When the circuit 91 is actuated by the signal on the conductor 107, it generates on its outputs 92 and 93 the signals L and TR at levels 0 and 1, respectively. More precisely, the signal present on the conductor 107 acts on the circuit 91 in the opposite manner to that in which the signal generated by the key 8 acts. To sum up, the circuit 91 generates on its outputs 92 and 93 two signals L and TR which are at logical levels 1 and 0 when the conductors 81 and 99 are activated, at logical level 1 when the conductor 82 is activated, and at logical levels 0 and 1 when the conductor 107 is activated. The circuit 100, on the other hand, activates its output 103 when L = 1, TR = 0, N = 0 or P = 0, while it activates its output 99 when L = 0, TR = 1, N = 1 and P = 0.

The circuits 85 and 91, 100 and 105 are not described in detail here, since they can easily be produced by an expert in the design of logic circuits by suitably combining gate circuits of the NAND type, for example, in such manner as to obtain the output signals hereinbefore described in correspondence with the input signals coming from the keys 7, 8 and 9, the dial 10 and the conductors 76 and 77.

GENERAL OPERATION

When the operator wishes to select local operation of the teleprinter 1, he actuates the key 7 (FIG. 1) of the panel 6, whereby the circuit 85 (FIG. 5) of the line control unit 3 activates the conductor 90, so that the motor driving the teleprinter 1 and the receiving relay are started. In this way, the operator can carry out home operations, such as, for example, the punching of a message on the tape.

When, on the other hand, the operator wishes to transmit a message, he actuates the key 8 of the panel 6, whereby the circuit 91 (FIG. 5) generates on the conductors 30 and 35 the signals L and TR at logical levels 1 and 0, respectively. Because of this, as has been seen, the switching circuit 13 changes the value of the line current from the value of −5mA to the value of −40 mA (FIG. 2). This change in current is detected by the telegraph station 5 (FIG. 1), which in turn, if it is of type A, reverses the polarity of the line current (solid line of FIG. 2); if, on the other hand, the station 5 is of type B, it sends the negative pulse 15 to the line control unit 3. In the first case, the switching circuit 13 (FIG. 4) will generate on the conductors 76 and 77 the signals N = 0 and P = 1, respectively, as has been said, and in the second case it will generate the signals N = 1 and P = 0, respectively. In both cases the circuit 100 of the selection circuit 11 (FIG. 5) recognizes the signal P = 0 or N = 0, since the signals L = 1 and TR = 0 are present on the conductors 92 and 93. There is therefore enabled either the keyboard of the teleprinter 1 or the dial 10, through the gate circuit 104. At this point, the operator can set up the number of the called teleprinter 16 with his fingers either through the keyboard or through the dial 10, as a result of which the pulses corresponding to the selected number, which are positive in the first case and negative in the second, are transmitted through the conductors 96 and 83 and the gate circuits 111 and 104 on the conductor 35. There is therefore obtained a modulation of the signal TR which determines in turn, as has been seen, the modulation of the line current from the value of +40mA to the value 0 by the switching circuit 13. In this way, current pulses corresponding to the selected number are transmitted on the telegraph line 4.

When the telegraph station recognizes the selected number, it inverts in known manner the current on the line 18 (FIG. 1) connected to the called teleprinter. If the latter is free, a current of −5mA (FIG. 3) will be present on the line 18. When the station 5 reverses the polarity of the current on the line 18, the line control unit 17 must put itself into the receiving state in the manner which will now be described. As has been said, the line control unit 17 is of the same type as the line control unit 3 and therefore comprises in turn a selection circuit and a switching circuit like the selection circuit 11 and the switching circuit 13 described earlier.

When the current on the line 18 becomes positive because of the inversion produced by the station 5, it flows through the diode 20 (FIG. 4) and the transistor 24. The positive current, however, is recognized by the coupler 70, which therefore generates a signal P at level 0. Since L = 0, TR = 1, N = 1 and P = 0, this causes the activation by the circuit 100 of the conductor 99, which acts on the circuit 91 in such manner that this circuit brings the signals L and TR to logical values 1 and 0, respectively. Consequently, the current of +40mA is established on the line 18. At this point, a current of +40mA is established on the two lines 4 and 18 (FIGS. 2 and 3), so that the operator can initiate the transmission of the message. This takes place by means of the modulation of the signal TR on the conductor 35 by the punched tape reader in any known manner. Correspondingly, the conductor 77 of the called line control unit 17 transmits the signals corresponding to the received message to the receiving relay by means of a circuit not shown in the drawings.

When the message is finished, the operator actuates the end or termination key 9 which, as has been seen, commands the circuit 91 to generate on the conductors 30 and 35 the two signals L and TR, both at logical level 1. This, as has been said, produces the interruption of the line current (FIGS. 2 and 3). This interruption is recognised by the circuits 105 of the two line control units 3 and 17, so that if it lasts for an interval of time equal to the delay time of the delay circuit 106, this last mentioned circuit acts through the conductor 107 on the circuit 91 in such manner that the latter generates on its outputs 92 and 93 the signals L and TR at levels 0 and 1, respectively. The absence of line current is moreover recognised by the station 5, which therefore reverses the polarity of the current, which becomes negative. Since the signals L and TR are 0 and 1, respectively, the line current reaches the inoperative value of −5mA (FIGS. 2 and 3), therefore putting the two line control units 3 and 17 into the inoperative state.

It will be understood that various modifications may be made in the described line without departing from the scope of the invention as claimed.

For example, in some countries it is required that, when a call is initiated from the station, the line current must assume a value of +15mA. This can easily be achieved by connecting in series with the diode 20 a resistor such that the current is limited to a value of +15mA.

Moreover, the switching circuit 13 may command through the medium of the signals N and P present on the conductors 76 and 77 the lighting-up of pilot lamps arranged on the panel 6 for the purpose of giving the operator a visual indication of the working state of the line control unit itself.

Figure 6:
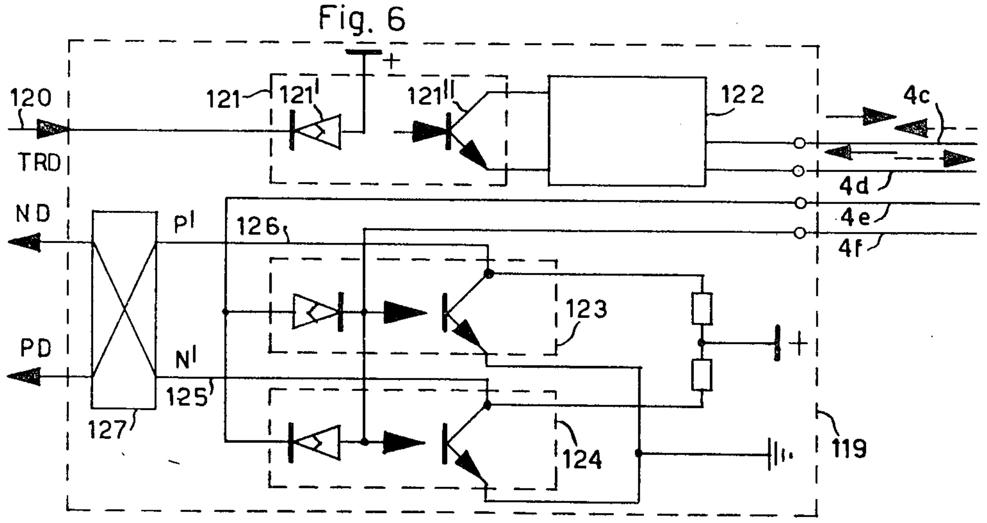
FIG. 6 is a diagram of the switching circuit of a four-wire line control unit.
Figure 7:
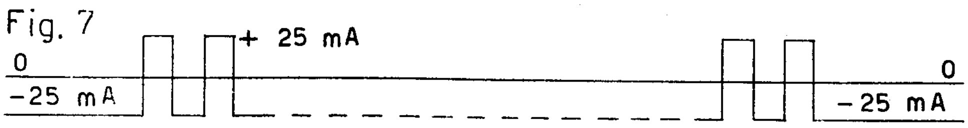
FIG. 7 is a diagram of the current flowing in a four-wire line.

Finally, the switching circuit 13 may be modified to function on double-current lines. As is known, in these lines the current flows through four wires 4*c*, 4*d*, 4*e* and 4*f* (FIG. 6); the wires 4*c* and 4*d* are used for transmission, while the wires 4*e* and 4*f* are used for reception. The line current flowing in the four wires is modulated by the double-current line control unit between two values, one of which is positive and one negative (FIG. 7). More particularly, a double current line control unit comprises a switching circuit 119 (FIG. 6) having an input 120 on which there is present a signal TRD which is generated in a manner substantially similar to the signal TR hereinbefore described. The sequence of the signals TRD corresponds to the decoding of the message transmitted by the teleprinter, so that the double-current line control unit has the function of modulating the current in sign in correspondence with each signal TRD. More precisely, when the signal TRD is at level 0, the optoelectronic coupler 121 comprising a photoemissive diode 121′ and a photosensitive transistor 121″ commands a circuit 122 in such manner that the latter causes the positive current (solid-line arrow) to flow on the wires 4*c* and 4*d;* if, on the other hand, the signal TRD is at logical level 1, the circuit 122 causes a negative current to flow (dash-line arrow). In this way, the absence or presence of the signal TRD corresponds to a state of the current corresponding to a positive value or a negative value. The circuit 122 can easily be produced by an expert in the design of logic circuits and is therefore not now described in detail. It is to be noted that a single optoelectronic coupler is used for the double-current line control unit to modulate the transmitted message, instead of the two couplers 31 and 36 used in the single-current line control unit; the reason for this lies in the fact that with double current there is no need to modulate the current in amplitude, as happens, on the other hand, with single current, but it is only necessary to modulate the current in sign. The two receiving conductors 4*e* and 4*f* are connected to two optoelectronic couplers 123 and 124 which generate two signals N1 and P1 on their outputs 125 and 126 in the manner already described for the signals N and P, respectively. The signals N1 and P1 are applied in turn to the control inputs of a bistable multivibrator 127, the outputs ND and PD of which are utilized for decoding the incoming message in a manner substantially identical to that already described for the signals N and P. The use of two optoelectronic circuits 123 and 124 instead of only one enables the two active states of the current (positive current and negative current) to be distinguished from the zero state. In fact, when the line current is zero, the two signals ND and PD are both at level 1, while in the other cases they are at different logical levels.

What we claim is:

1. A line control unit for connecting a teleprinter to a transmission line comprising:

a switching circuit for defining different operation modes of the teleprinter by means of a pair of command signals, a first combination of said pair of signals (L=0, TR=1) indicating a local operation mode, a second combination (L=1, TR=0) of said pair indicating a request for transmission mode, an actuating circuit for modulating the amplitude of the electrical current flowing on said line from a first value to a second value according to the mode indicated by said couple of signals, and a pair of optoelectronic coupling circuits for supplying said actuating circuit with a pair of control signals associated with said pair of command signals and for providing an electrical isolation between said switching circuit and said actuating circuit, wherein said actuating circuit comprises:

a first electronic switch disposed in series with said line through a resistor and having a control input via one of said pair of optoelectronic coupling circuits responsive to one control signal of said pair of signals for modulating the amplitude of said line current to said first value, a second electronic switch disposed in series with said line and in parallel with said first electronic switch and responsive via the other of said optoelectronic coupling circuits to the other control signal of said pair for modulating the amplitude of said line current to said second value.

2. A line control unit according to claim 1, wherein said optoelectronic coupling circuits comprise a photoemitting diode and a phototransistor having the base consisting of a photosensitive material.

3. A line control unit according to claim 2, wherein each of said electronic switches comprises a transistor having the emitter-collector circuit connected in series with said line and the base-collector circuit controlled by the output of the corresponding phototransistor.

* * * * *